(12) United States Patent
Lipawsky

(10) Patent No.: US 9,678,359 B2
(45) Date of Patent: Jun. 13, 2017

(54) EYEWEAR WITH INTERCHANGEABLE MAGNETICALLY-HELD STEMS AND STRAP CONNECTORS

(71) Applicant: Steven R. Lipawsky, Coral Springs, FL (US)

(72) Inventor: Steven R. Lipawsky, Coral Springs, FL (US)

( * ) Notice: Subject to any disclaimer, the term of this patent is extended or adjusted under 35 U.S.C. 154(b) by 58 days.

(21) Appl. No.: 14/663,449

(22) Filed: Mar. 19, 2015

(65) Prior Publication Data
US 2015/0301359 A1 Oct. 22, 2015

Related U.S. Application Data

(60) Provisional application No. 61/995,775, filed on Apr. 21, 2014.

(51) Int. Cl.
*G02C 5/14* (2006.01)
*G02C 3/00* (2006.01)

(52) U.S. Cl.
CPC ............ *G02C 5/146* (2013.01); *G02C 3/003* (2013.01); *G02C 2200/02* (2013.01); *G02C 2200/08* (2013.01)

(58) Field of Classification Search
CPC ........ G02C 5/143; G02C 5/146; G02C 3/003; G02C 11/00; G02C 2200/02; G02C 2200/08
USPC .......................... 351/158, 111, 116, 119, 121
See application file for complete search history.

(56) References Cited

U.S. PATENT DOCUMENTS

2009/0195747 A1* 8/2009 Insua .................... G02C 5/146
351/116

* cited by examiner

*Primary Examiner* — Bumsuk Won
*Assistant Examiner* — Wen Huang
(74) *Attorney, Agent, or Firm* — Assouline & Berlowe, PA; Loren Donald Pearson

(57) ABSTRACT

Eyewear with interchangeable magnetically-held stems and strap connectors utilize overlapping magnets with aligned magnetic poles where the poles are orthogonal to the axes of insertion of the magnets. A hook or pawl can be added to one of the magnetics and an indentation added to the other to create a physical as well as magnetic connection.

10 Claims, 8 Drawing Sheets

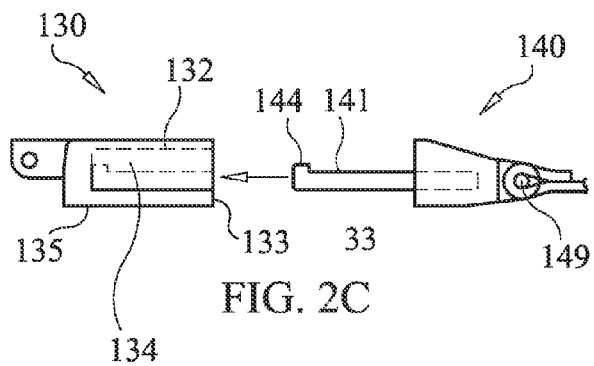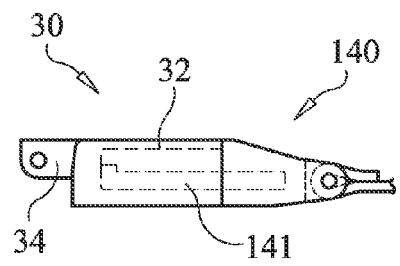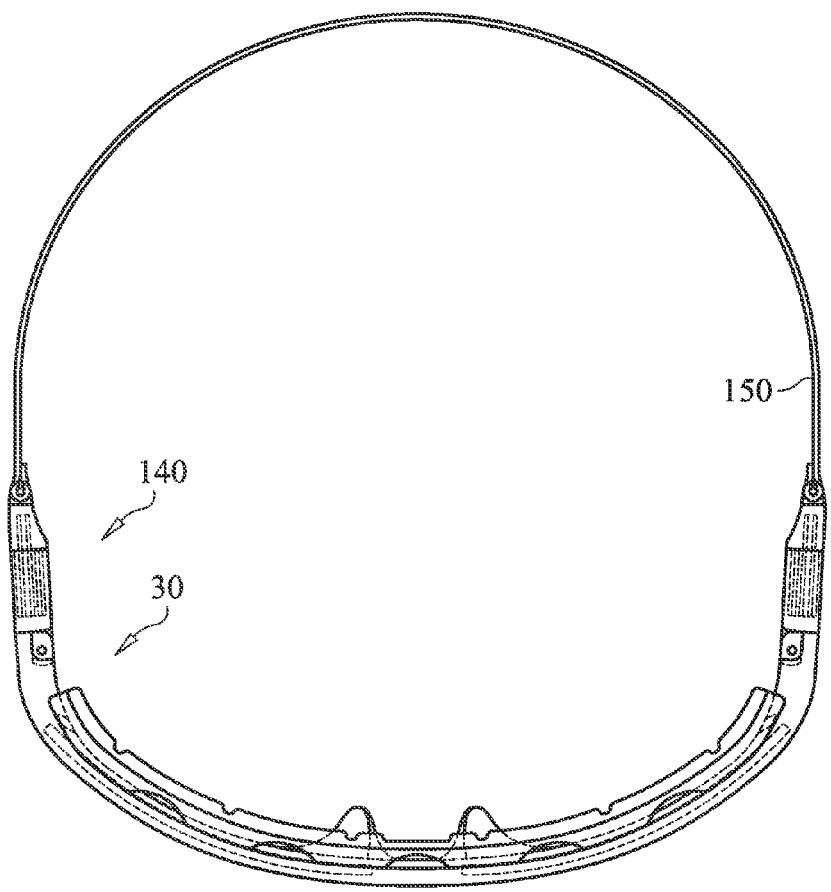
FIG. 2C
FIG. 2D
FIG. 2E

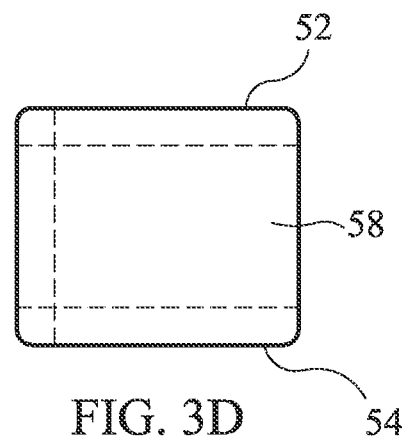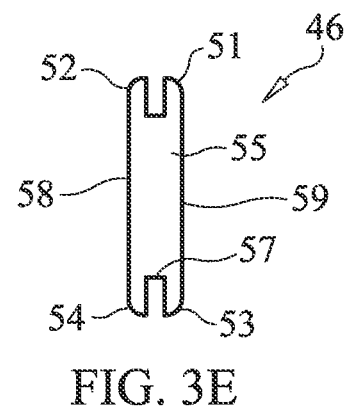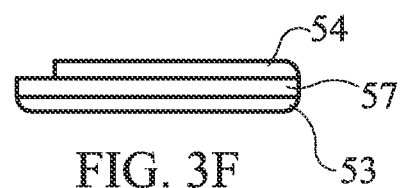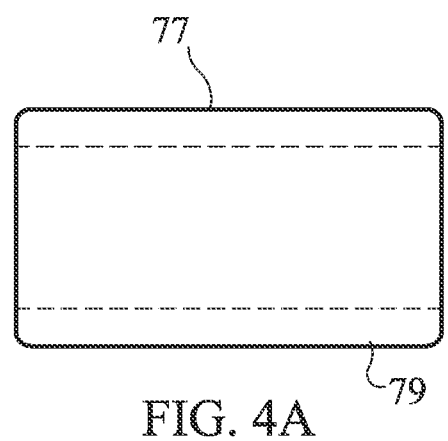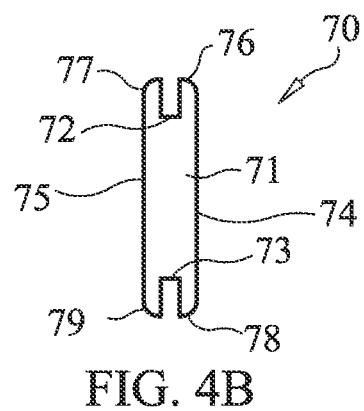

EYEWEAR WITH INTERCHANGEABLE MAGNETICALLY-HELD STEMS AND STRAP CONNECTORS

CROSS-REFERENCE TO RELATED APPLICATIONS

This application claims the benefit of U.S. Provisional Application No. 61/955,775, filed Mar. 19, 2014.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to eyeglasses and in particular to removable temples for eyewear.

Description of the Related Art

Not applicable.

BRIEF SUMMARY OF THE INVENTION

The invention encompasses eyewear with interchangeable magnetically-held stems and strap connectors.

An object of the invention is to provide eyewear with stems that can be exchanged for differently styled stems or for a headband connector. A further object is to provide eyewear with a magnetic mechanism that is strong enough to hold the pieces of eyewear together during normal use.

In accordance with the objects, a magnetic connector is provided. The magnetic connector calls for two magnets, one on each piece being connected to overlap each other laterally. The two magnets are aligned so that, in an inserted position, the two magnets overlap each other with the poles of the magnets aligned. For example, the magnetic north poles of both of the magnets can be aimed in the same lateral direction.

A further object of the invention is to provide a mechanical holder that can work in conjunction with the magnetic connector to strengthen the connection further. To accomplish this object, a hook or pawl can be added to one of the magnets and a complementary indentation can be formed in the other magnet so when the first magnet is inserted a physical as well as magnetic connection can work to hold the stem or connector to the temple.

Other features of the invention are set forth in the appended claims.

Although the invention is illustrated and described herein as embodied in eyewear with interchangeable magnetically-held stems and strap connectors, the invention is not limited to the details shown because various modifications and structural changes may be made without departing from the invention and the equivalents of the claims. However, the construction and method of operation of the invention together with additional objects and advantages thereof will be best understood from the following description of specific embodiments when read in connection with the accompanying drawings.

BRIEF DESCRIPTION OF THE SEVERAL VIEWS OF THE DRAWING

FIG. 2C is a top side view of a temple and headband connecter in an uninserted position.

FIG. 2D is a top side view of the temple and headband connector shown in FIG. 2C in an inserted position.

FIG. 2E is a top side view of the eyewear shown in FIG. 2A.

FIG. 3D is a left side view of a socket magnet.

FIG. 3E is a rear side view of the socket magnet shown in FIG. 3D.

FIG. 3F is a top side view of the socket magnet shown in FIG. 3D.

FIG. 4A is a left side view of a magnetic plug used with the stem.

FIG. 4B is a rear side view of the socket magnet shown in FIG. 4A.

FIG. 4C is a top side view of the socket magnet shown in FIG. 4A.

DETAILED DESCRIPTION OF THE INVENTION

Figure 1A:
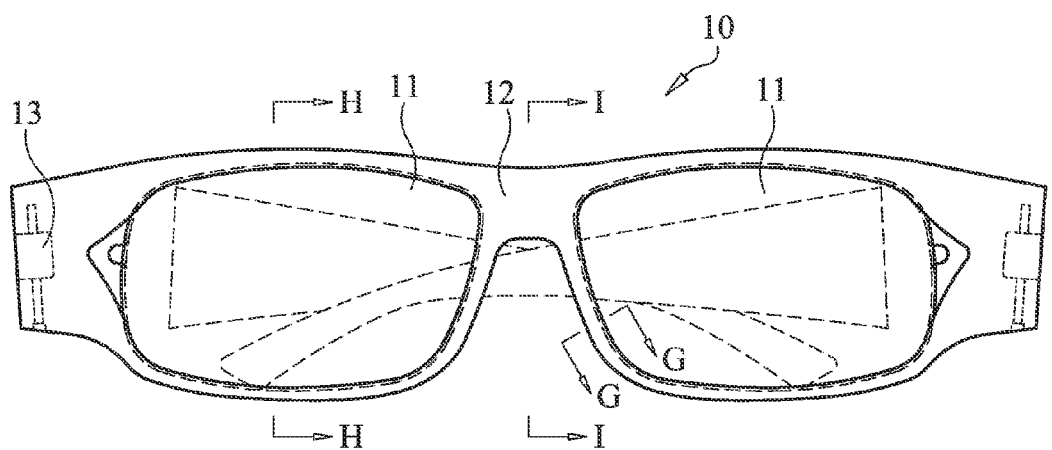
FIG. 1A is a front side view of eyewear according to the invention with interchangeable stems in a folded position.
Figure 1B:
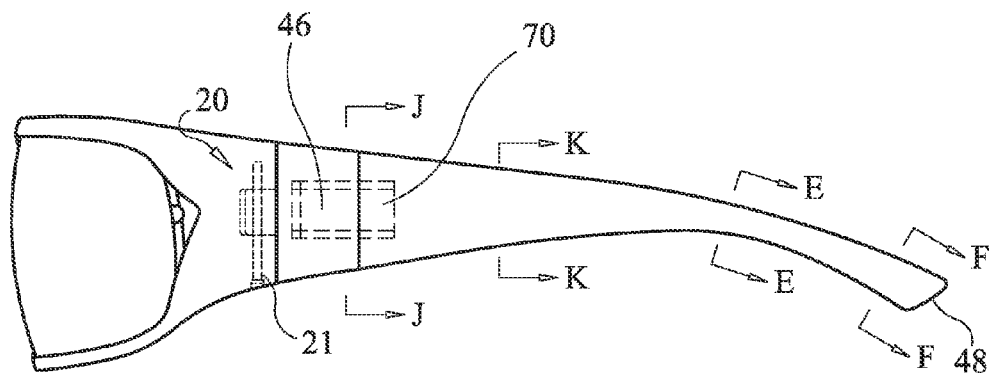
FIG. 1B is a left side view of the eyewear shown in FIG. 1A with the interchangeable stems in an unfolded position.

Embodiments of the invention are described below and are shown in the figures of the drawing.

FIGS. 1A-1L show a preferred embodiment of the eyewear with removable stems 40 installed.

The lenspiece 10 in one embodiment is a customary lenspiece 10. The lenspiece 10 includes a lensframe 14. The lensframe 14 surrounds and secures the lenses 11. A bridge 12 interconnects the lensframes 14. A lenspiece leaf 13 is connected to each lateral side of the lensframe 14.

A hinge 20 connects the lenspiece leaf 13 to a temple leaf 34. A hinge pin 21 connects the lenspiece leaf 13 to the temple leaf 34.

The temple 30 includes a temple body 35. The temple body 45 has a socket 31 formed at its distal (i.e. closer to the ear of a wearer) end. In the embodiment that is shown, the socket 31 has a rectangular cross section with a top 36, a bottom 37, a lateral side 38, and a medial side 39. A socket top rail 45 is formed on the top 36 of the socket 31 and runs along the axis of the temple 30. A socket bottom rail 45 is formed on the bottom 37 of the socket 31 and runs along the axis of the temple 30.

A lateral magnet 46 is fixed to the lateral side 38 of the socket 31 and has a magnetic pole aligned laterally. That is, the magnetic north or south pole is directed outward. The lateral magnet fills only a portion of the socket 31 to leave a medial subsocket 47 beside the lateral magnet 46.

FIGS. 3G-3L show the lateral magnet 46. The lateral magnet 46 has a body 55 with a top 56, a bottom 57, a lateral surface 58, and a medial surface 59. A top medial rail 51 is disposed on the top 56 of the body 55. A top lateral rail 52 is disposed on the top 56 of the body 55. A bottom medial rail 53 is disposed on the bottom of the body 55. A bottom lateral rail 54 is disposed on the bottom 57 of the body 55. The top lateral rail 52 and the top medial rail 51 sandwich the socket top rail 44. The bottom lateral rail 54 and the bottom medial rail 53 sandwich the socket bottom rail 45. The subsocket top rail 44 is formed on the top 36 of the subsocket 47 and a subsocket bottom rail 45 is formed on the bottom 37 of the subsocket 47. The medial surface 59 of the lateral magnet 32 has an indentation 134 formed therein.

Figure 1C:
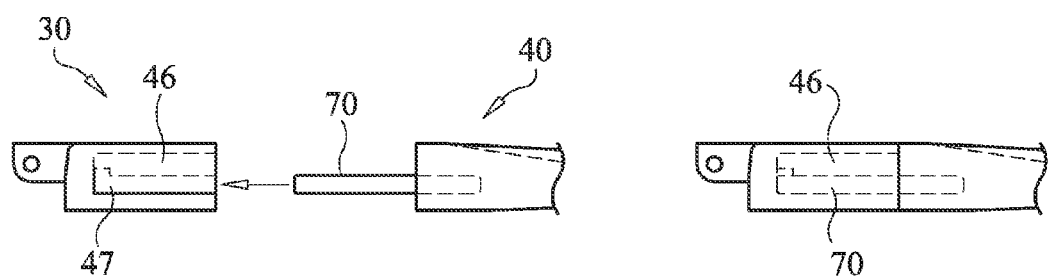
FIG. 1C is a partial top side view of the eyewear shown in FIG. 1A with the temple separated from the stem.
Figure 1D:
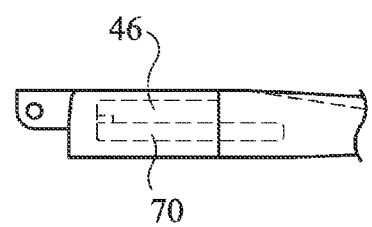
FIG. 1D is a partial top side view of the eyewear shown in FIG. 1C with the temple connected to the stem.
Figure 1E:
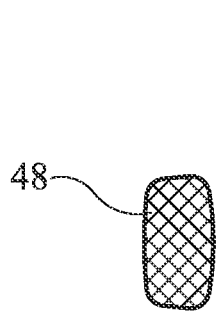
FIG. 1E is a sectional view taken along line E-E in FIG. 1B.
Figure 1F:
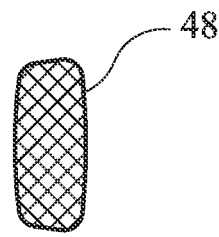
FIG. 1F is a sectional view taken along line F-F in FIG. 1B.
Figure 1G:
FIG. 1G is a sectional view taken along line H-H in FIG. 1A.
Figure 1H:
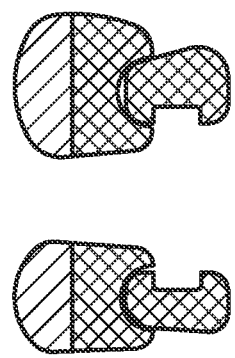
FIG. 1H is a sectional view taken along line A-A in FIG. 1A.
Figure 1I:
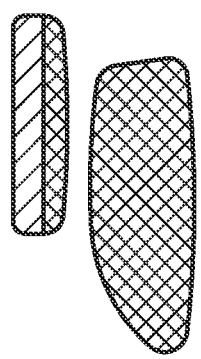
FIG. 1I is a sectional view taken along line B-B in FIG. 1A.
Figure 1J:
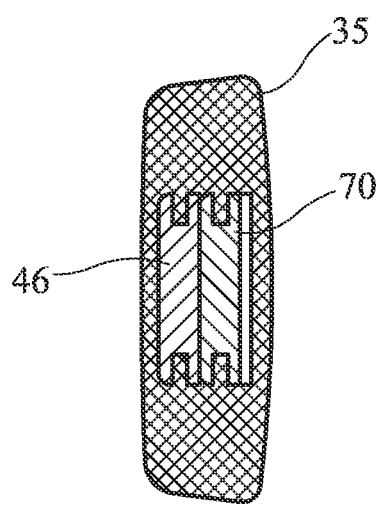
FIG. 1J is a sectional view taken along line C-C in FIG. 1B.
Figure 1K:
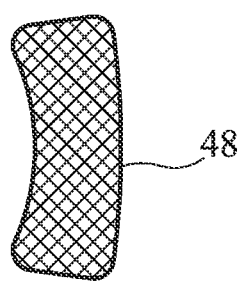
FIG. 1K is a sectional view taken along line D-D in FIG. 1B.
Figure 1L:
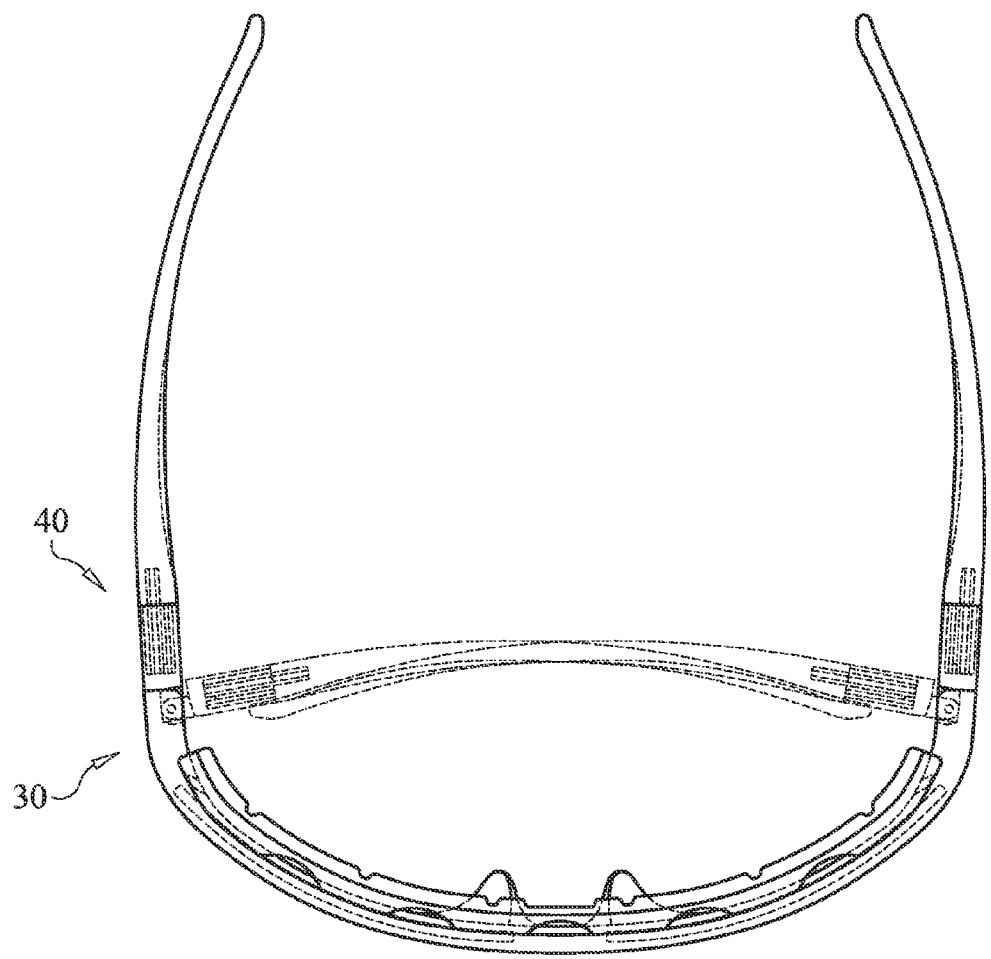
FIG. 1L is a top side view of the eyewear shown in FIG. 1A with the interchangeable stems in the unfolded position and showing the interchangeable stems in phantom in the folded position.
Figure 1M:
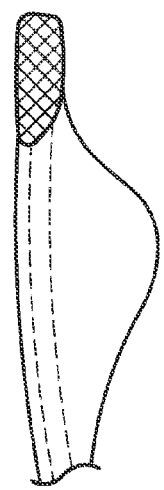
FIG. 1M is a side view of a nosepiece.

As shown in FIGS. 1C and 1D particularly, an interchangeable stem 40 can be inserted into and secured to the temple 30. The stem 40 has a distal end 48 and a proximal abutment 43. The distal end 48 of the stem is configured to overlie a wearer's ear when worn. A prong 70 is disposed on said proximal abutment 43 of the stem 40. The temple 30 is configured to fit within the medial subsocket 47. The prong 70 has a magnetic pole. The magnetic pole is configured to align with the magnetic pole of the lateral magnet 46 when the prong 70 is inserted within the medial subsocket 47.

As shown in FIGS. 4A-4F, the prong 70 has a body 71 with a top 72, a bottom 73, a medial surface 74, and a lateral surface 75. A top medial rail 76 is disposed on said top 72 of said body 71. A top lateral rail 77 is disposed on the top 72 of the body 71. A bottom medial rail 78 is disposed on the bottom 73 of the body 71. A bottom lateral rail 79 is disposed on the bottom 73 of the body 71. The top lateral rail 72 and the top medial rail 76 sandwich the socket top rail 44 when the prong 70 is inserted in the subsocket 47. The bottom lateral rail 79 and the bottom medial rail 78 sandwich the socket bottom rail 45 when the prong 70 is inserted in the subsocket 47.

Figure 2A:
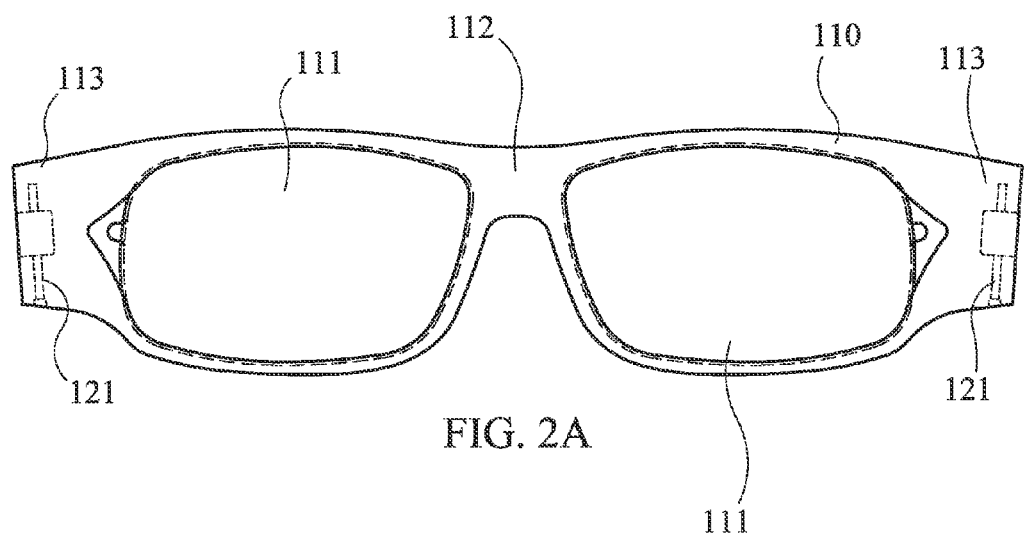
FIG. 2A is a front side view of the eyewear shown in FIG. 1A with an interchangeable headband connector inserted in the temples.
Figure 2B:
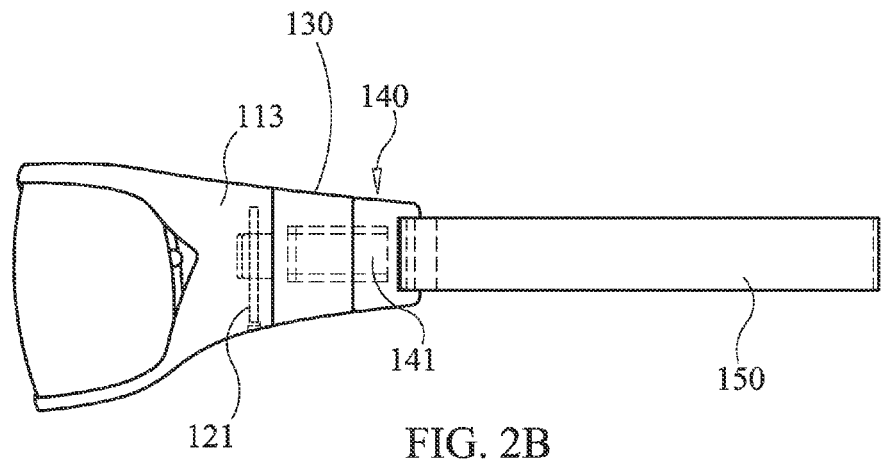
FIG. 2B is a left side view of the eyewear shown in FIG. 2A.
Figure 2F:
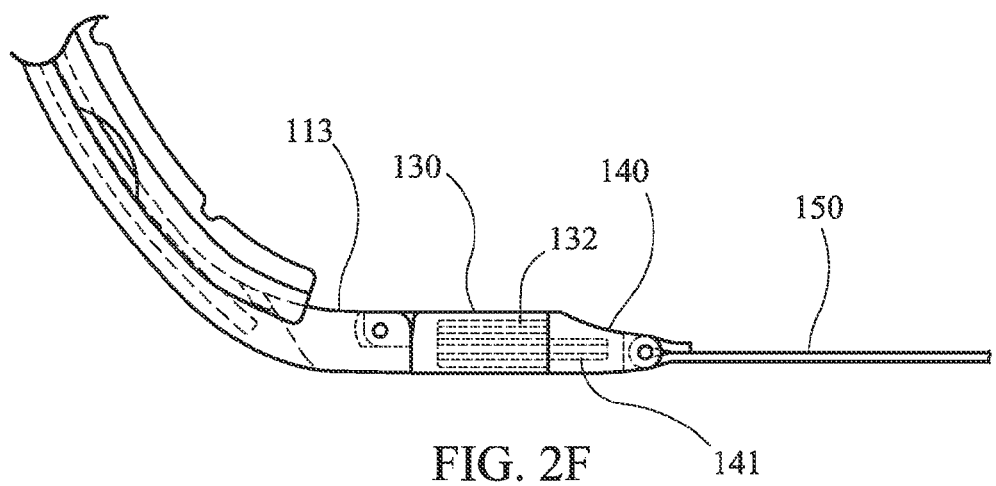
FIG. 2F is a top side view of the eyewear shown in FIG. 2E.
Figure 2G:
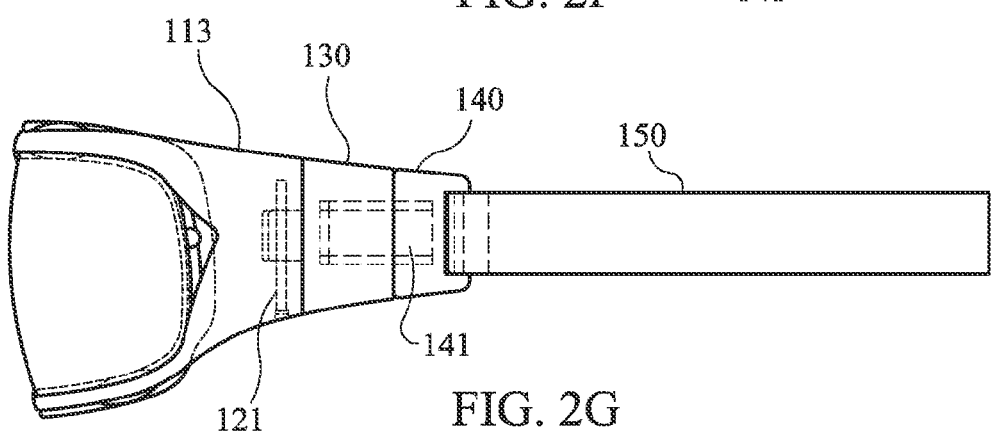
FIG. 2G is left side view of the eyewear shown in FIG. 2F.
Figure 2H:
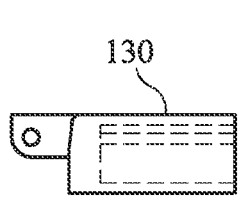
FIG. 2H is a top side view of temple shown in FIG. 2A.
Figure 2I:
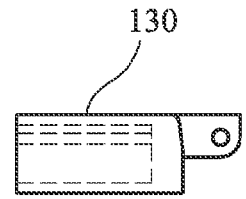
FIG. 2I is a bottom side view of the temple shown in FIG. 2H.
Figure 2J:
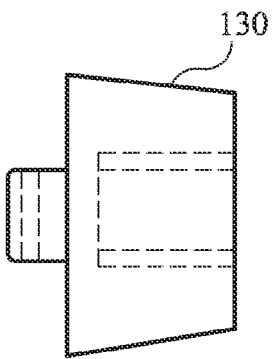
FIG. 2J is a side view of a temple.
Figure 2K:
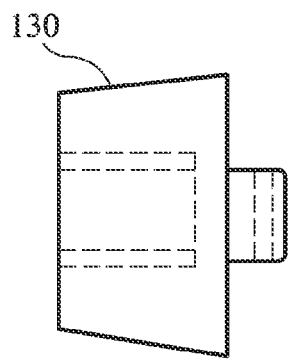
FIG. 2K is a side view of the temple shown in FIG. 2J.
Figure 2L:
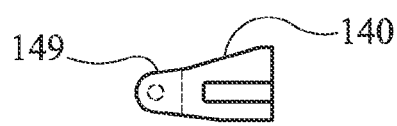
FIG. 2L is a top side view of the headband connector shown in FIG. 2J.
Figure 2M:
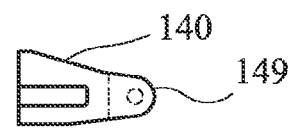
FIG. 2M is a bottom side view of the headband connector shown in FIG. 2L.
Figure 2N:
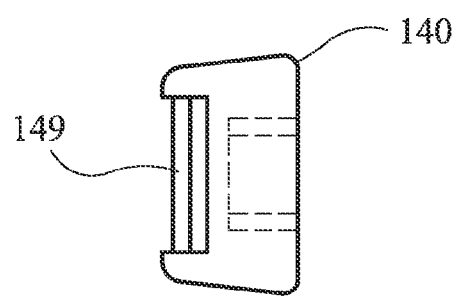
FIG. 2N is a side view of a headband connector.
Figure 2O:
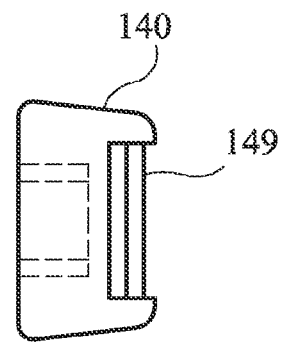
FIG. 2O is a side view of the headband connector shown in FIG. 2J.
Figure 3A:
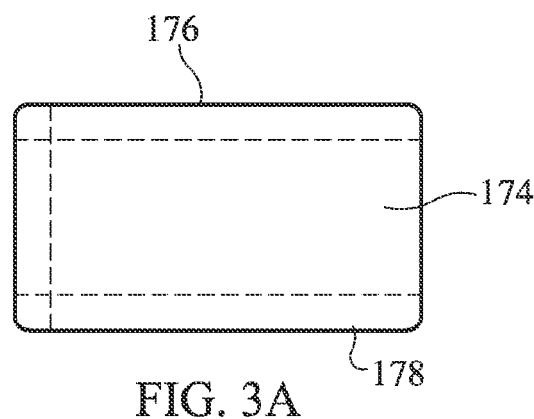
FIG. 3A is a left side view of a magnetic plug used with the headband connector.
Figure 3B:
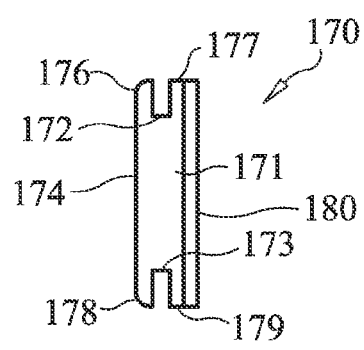
FIG. 3B is a rear side view of the magnetic plug shown in FIG. 3A.
Figure 3C:
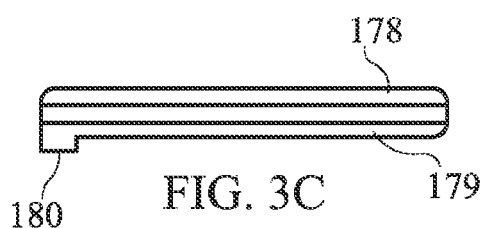
FIG. 3C is a top side view of the magnetic plug shown in FIG. 3A.

FIGS. 2A-2O show the eyewear with an interchangeable strap connector 140. The interchangeable strap connector 140 has a distal end 148 and proximal end 143. The distal end 148 of the interchangeable strap connector 140 has a connector 149 for connecting to a head strap 150. A prong 170 is disposed on the proximal end 143 of the interchangeable strap connector 140. The prong 170 is configured to fit within the medial subsocket 47. The prong 170 has a magnetic pole. The magnetic pole is configured to align with the magnetic pole of the lateral magnet 46 when the prong 170 is inserted within the medial subsocket 47.

As shown in FIGS. 3A-3F, the prong 170 has a body 171 with a top 172, a bottom 173, a lateral surface 175, and a medial surface 174. A top medial rail 176 is disposed on the top 172 of the body 171. A top lateral rail 177 is disposed on the top 171 of the body 170. A bottom medial rail 178 is disposed on the bottom 173 of the body 171. A bottom lateral rail 179 is disposed on the bottom 173 of the body 171. The top lateral rail 177 and the top medial rail 176 sandwich the socket top rail 44 when the prong 170 is inserted. The bottom lateral rail 179 and the bottom medial rail 178 sandwich the socket bottom rail 45. The lateral surface 175 of the prong 170 has a pawl 180 formed thereon. The pawl 180 is configured to seat in the indentation 134 when the prong 170 is inserted in the subsocket 47.

What is claimed is:

1. Eyewear with interchangeable magnetic temples, comprising:

a temple including:

a temple body configured to be connected to a lens frame, said temple body having a socket formed therein, said socket having a top, a bottom, a lateral side, and a medial side, a socket top rail being formed on said top and a socket bottom rail being formed on said bottom;

a lateral magnet being fixed to said lateral side of said recess and having a magnetic pole aligned laterally, said lateral magnet filling only a portion of said socket to leave a medial subsocket beside said lateral magnet; said lateral magnet having a body with a top, a bottom, a lateral surface, and a medial surface, a top medial rail being disposed on said top of said body, a top lateral rail being disposed on said top of said body, a bottom medial rail being disposed on said bottom of said body, a bottom lateral rail being disposed on said bottom of said body, said top lateral rail and said top medial rail sandwiching said socket top rail, and said bottom lateral rail and said bottom medial rail sandwiching said socket bottom rail; a subsocket top rail being formed on said top of said sub socket and a subsocket bottom rail being formed on said bottom of said sub socket, said medial surface of said lateral magnet having an indentation formed therein; and an interchangeable stem including:

a temple having a distal end and proximal end, said distal end of said stem being configured to overlie a wearer's ear when worn; and a prong being disposed on said proximal end of said temple being configured to fit within said medial subsocket, said prong including a magnet having a magnetic pole, said magnetic pole being configured to align with said magnetic pole of said lateral magnet when said prong is inserted within said medial subsocket; said prong having a body with a top and a bottom, a top medial rail being disposed on said top of said body, a top lateral rail being disposed on said top of said body, a bottom medial rail being disposed on said bottom of said body, a bottom lateral rail being disposed on said bottom of said body, said top lateral rail and said top medial rail sandwiching said socket top rail, and said bottom lateral rail and said bottom medial rail sandwiching said socket bottom rail, said top lateral rail and said top medial rail sandwiching said subsocket top rail when said prong is inserted in said subsocket, said bottom lateral rail and said bottom medial rail sandwiching said subsocket bottom rail when said prong is inserted in said subsocket.

2. Eyewear with interchangeable magnetic temples, comprising:

a temple including:
a temple body configured to be connected to a lens frame, said temple body having a socket formed therein, said socket having a top, a bottom, a lateral side, and a medial side, a socket top rail being formed on said top and a socket bottom rail being formed on said bottom;
a lateral magnet being fixed to said lateral side of said recess and having a magnetic pole aligned laterally, said lateral magnet filling on a portion of said socket to leave a medial subsocket beside said lateral magnet; said lateral magnet having a body with a top, a bottom, a lateral surface, and a medial surface, a top medial rail being disposed on said top of said body, a top lateral rail being disposed on said top of said body, a bottom medial rail being disposed on said bottom of said body, a bottom lateral rail being disposed on said bottom of said body, said top lateral rail and said top medial rail sandwiching said socket top rail, and said bottom lateral rail and said bottom medial rail sandwiching said socket bottom rail; a subsocket top rail being formed on said top of said sub socket and a subsocket bottom rail being formed on said bottom of said sub socket, said medial surface of said lateral magnet having an indentation formed therein; and an interchangeable strap connector having a distal end and proximal end, said distal end of said interchangeable strap connector having a connector for connecting to a head strap; and a prong being disposed on said proximal end of said interchangeable strap connector being configured to fit within said medial subsocket, said prong having a magnetic pole, said magnetic pole being configured to align with said magnetic pole of said lateral magnet when said prong is inserted within said medial subsocket; said prong having a body with a top, a bottom, a lateral surface, and a medial surface, a top medial rail being disposed on said top of said body, a top lateral rail being disposed on said top of said body, a bottom medial rail being disposed on said bottom of said body, a bottom lateral rail being disposed on said bottom of said body, said top lateral rail and said top medial rail sandwiching said socket top rail, and said bottom lateral rail and said bottom medial rail sandwiching said socket bottom rail, said top lateral rail and said top medial rail sandwiching said subsocket top rail when said prong is inserted in said subsocket, aid bottom lateral rail and said bottom medial rail sandwiching said subsocket bottom rail when said prong is inserted in said subsocket, said lateral surface of said prong having a pawl formed therein, said pawl being configured to seat in said indentation when said prong is inserted in said subsocket.

3. Eyewear with interchangeable magnetic temples, comprising:

a temple including:
a temple body configured to be connected to a lens frame, said temple body having a socket formed therein; and
a first magnet being disposed within said socket and having a magnetic north pole, said first magnet filling only a portion of said socket to leave a subsocket beside said first magnet; and an interchangeable stem including:
a temple having a distal end and proximal end; and
a prong being disposed on said proximal end of said temple and being configured to fit within said subsocket, said prong having a second magnet and a great enough length so said second magnet overlaps at least a portion of said first magnet when said prong is seated within said subsocket; said prong having a magnetic north pole, said magnetic north pole of said second magnet being aligned with said magnetic north pole of said first magnet when said prong is seated within said subsocket.

4. The eyewear according to claim 3, wherein:
one of said first magnet and said second magnet have a pawl disposed thereon; and
one of said first magnet and said second magnet not having said pawl disposed thereon has an indentation formed therein, said indentation being located and shaped to receive said pawl when said prong is seated within said subsocket.

5. The eyewear according to claim 3, wherein one of said first magnet and said second magnet has an axis of insertion, a first rail formed thereon, and a second rail formed thereon, said first rail and said second rail running parallel to said axis of insertion.

6. The eyewear according to claim 3, wherein said second magnet inserts parallel to said first magnet.

7. The eyewear according to claim 3, wherein said magnetic north pole of said first magnet and said magnetic north pole of said second magnet are aligned laterally.

8. The eyewear according to claim 3, further comprising an eyeglass stem housing a distal end of said prong, said eyeglass stem being configured to fit over an ear of a wearer.

9. The eyewear according to claim 3, further comprising a strap connector hosing a distal end of said prong.

10. The eyewear according to claim 9, further comprising a strap connected to said strap connector.

* * * * *